(12) United States Patent
Kakimoto et al.

(10) Patent No.: US 7,936,098 B2
(45) Date of Patent: May 3, 2011

(54) ROTARY ELECTRIC MACHINE

(75) Inventors: Tadaaki Kakimoto, Hitachi (JP); Hiroyuki Mae, Mito (JP); Keiji Fugane, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 75 days.

(21) Appl. No.: 12/540,944

(22) Filed: Aug. 13, 2009

(65) Prior Publication Data

US 2010/0045124 A1 Feb. 25, 2010

(30) Foreign Application Priority Data

Aug. 25, 2008 (JP) .................................. 2008-214787

(51) Int. Cl.
*H02K 5/24* (2006.01)
(52) U.S. Cl. ............................................ 310/51; 310/91
(58) Field of Classification Search .................... 310/89, 310/91, 51; 181/202
See application file for complete search history.

(56) References Cited

U.S. PATENT DOCUMENTS

| | | | |
|---|---|---|---|
| 2,973,442 A * | 2/1961 | Wilson ........................... | 310/431 |
| 3,980,912 A * | 9/1976 | Panza ............................. | 310/51 |
| 4,007,388 A * | 2/1977 | Lawyer et al. ................. | 310/51 |
| 4,402,383 A * | 9/1983 | Bailey ........................... | 181/202 |
| 4,469,973 A * | 9/1984 | Guyot et al. ................... | 310/433 |
| 5,026,476 A * | 6/1991 | Ishimoto et al. ................ | 210/89 |
| 7,679,232 B2 * | 3/2010 | Kakimoto et al. .............. | 310/51 |
| 2008/0203832 A1 | 8/2008 | Kakimoto | |

FOREIGN PATENT DOCUMENTS

| | | |
|---|---|---|
| JP | 05-219683 | 8/1993 |
| JP | 11-252850 | 9/1999 |
| JP | 2008-211944 | 9/2008 |

* cited by examiner

*Primary Examiner* — Nguyen N Hanh
(74) *Attorney, Agent, or Firm* — Brundidge & Stanger, P.C.

(57) ABSTRACT

A rotary electric machine, for solving problems that a space for installing the noise insulation enclosure around the rotary electric machine and a base for installing the noise insulation enclosure are necessary, and that the noise insulation enclosure reducing the noise on an outer side of the noise insulation enclosure does not reduce the noise on an inner side thereof, and the inspecting worker entering thereinto is exposed to a loud noise of the rotary electric machine, the rotary electric machine comprising a stator frame having a stator iron core incorporating a stator coil therein in an inner portion thereof, and a rotor in which a rotor coil rotating so as to oppose to the stator frame and the stator iron core is incorporated, further comprising a noise insulation plate fixed to a noise insulation plate attaching seat welded to an outer surface of the stator frame by a bolt and a nut, an elastic body which is provided in a contact portion between the noise insulation plate attaching seat and the noise insulation plate, and a vibration-proofing rubber washer which is provided in a contact portion between the noise insulation plate and the nut.

10 Claims, 8 Drawing Sheets

ROTARY ELECTRIC MACHINE

FIELD OF THE INVENTION

The present invention relates to a rotary electric machine, and more particularly to a rotary electric machine which is preferable for a structure employing a noise countermeasure.

DESCRIPTION OF RELATED ART

Since the rotary electric machine is generally rotated at a high speed such as 3000 rpm or 3600 rpm, a very loud noise is generated. Accordingly, various artifices are employed as the noise countermeasure.

Particularly, in the case that a noise regulation is severe, a countermeasure is carried out in such a manner as to surround a whole of the rotary electric machine by a noise insulation enclosure so as to control noise and keep a noise regulation value on an outer side of the noise insulation enclosure, as described in JP-A-5-219683. Further, as a noise countermeasure against a general noise regulation, there is a countermeasure that an internal sound is reduced by installing an acoustic absorbent on an inner side of a stator frame so as to intend to reduce the noise, as described in JP-A-11-252850. Further, as the other noise countermeasure, it is intended that a noise value is reduced by increasing a thickness of the stator frame.

However, if the whole of the rotary electric machine is surrounded by the noise insulation enclosure as mentioned above, there is a problem that a space for installing the noise insulation enclosure is necessary around the rotary electric machine, and a base for installing the noise insulation enclosure is necessary. The noise insulation enclosure reduces the noise on the outer side of the noise insulation enclosure, however, does not reduce the noise on an inner side of the noise insulation enclosure. Thus, since it is necessary for an inspection worker to enter into the enclosure, for example, in the case of inspecting the rotary electric machine, there is a risk that the inspecting worker entering into the noise insulation enclosure is exposed to a loud noise of the rotary electric machine. In addition, within the noise insulation enclosure, since the surface of the stator frame becomes high temperature at a time of operating the rotary electric machine, there is a problem that the temperature within the noise insulation enclosure is increased. Further, since the noise insulation enclosure is sufficiently shielded and sealed for noise insulation, there is a risk that a lack of oxygen is generated. In order to prevent these problems, it is necessary to be provided with a ventilating equipment. Further, a firefighting equipment is necessary within the noise insulation enclosure for safety reasons, and the incidental equipment of the noise insulation enclosure is large scaled.

On the other hand, in the case that an acoustic absorbent is attached to an inner side of the stator frame, the acoustic absorbent becomes fragile due to an aged deterioration of the acoustic absorbent, the acoustic absorbent flies in all directions due to an inside wind generated at a time of operating the rotary electric machine, and there is a risk of affecting a cooling performance of the rotary electric machine. Further, it is necessary to structure such that the acoustic absorbent is fixed to the stator frame for attaching the acoustic absorbent, and there is a problem that the structure of the stator frame is complicated. Further, in the case that the stator frame is made thick, there is a problem that a weight of a power generator is increased by increasing the thickness.

BRIEF SUMMARY OF THE INVENTION

The present invention is made by taking the actual condition mentioned above into consideration, and an object of the present invention is to provide a rotary electric machine which can achieve a low noise by a simple structure even in the case that a noise regulation value is severe, does not require any additional equipment, and requires only a minimum increase of weight.

In order to achieve the object mentioned above, in accordance with the present invention, there is provided a rotary electric machine including: a stator in which a stator coil is incorporated in a stator iron core; and a rotor which is disposed to face the stator and in which a rotor coil is incorporated in a rotor iron core, the stator and the rotor being accommodated in a stator frame, wherein the rotary electric machine further includes: an acoustic absorbent which is disposed on an outer surface of the stator frame; a plurality of noise insulating plates which are disposed in a divided manner on an outer surface of the acoustic absorbent; an L-shaped section noise insulation plate attaching seat which is fixed to the stator frame and extends along edge parts of a side portion of the stator frame at the edge parts thereof; and, a T-shaped section noise insulation plate attaching seat which is fixed to the stator frame and extends in an axial direction from a center part of the side portion of the stator frame, wherein the noise insulation plates disposed in a divided manner are fixed to the L-shaped section noise insulation plate attaching seat and the T-shaped section noise insulation plate attaching seat by using fastening means, and wherein elastic bodies are installed between the noise insulation plates and the L-shaped section and T-shaped section noise insulation plate attaching seats, and are installed between the noise insulation plates and the fastening means.

Alternatively, the rotary electric machine further includes: an L-shaped section noise insulation plate attaching seat which is fixed to the stator frame and extends along edge parts of a side portion of the stator frame at the edge parts thereof; and a T-shaped section noise insulation plate attaching seat which is fixed to the stator frame and extends in an axial direction from a center part of the side portion of the stator frame, wherein the noise insulation plates disposed in a divided manner are fixed to the L-shaped section noise insulation plate attaching seat and the T-shaped section noise insulation plate attaching seat by using fastening means, wherein elastic bodies are installed between the noise insulation plates and the L-shaped section and T-shaped section noise insulation plate attaching seats, and are installed between the noise insulation plates and the fastening means, wherein a space portion is formed between the stator frame and the noise insulation plates, and wherein a pressure of the space portion is allowed to be negative or inert gas is filled in the space portion.

In accordance with the present invention, it is possible to obtain the rotary electric machine which can achieve a low noise by a simple structure even in the case that the noise regulation value is severe, does not require any additional equipment, and requires only a minimum increase of weight.

It is possible to achieve the purpose of obtaining the rotary electric machine which can achieve the low noise by the simple structure even in the case that the noise regulation value is severe, does not require any additional equipment, and requires only the minimum increase of weight, without devising any special means.

Other objects, features and advantages of the invention will become apparent from the following description of the embodiments of the invention taken in conjunction with the accompanying drawings.

DETAILED DESCRIPTION OF THE INVENTION

Embodiment 1

Figure 1:
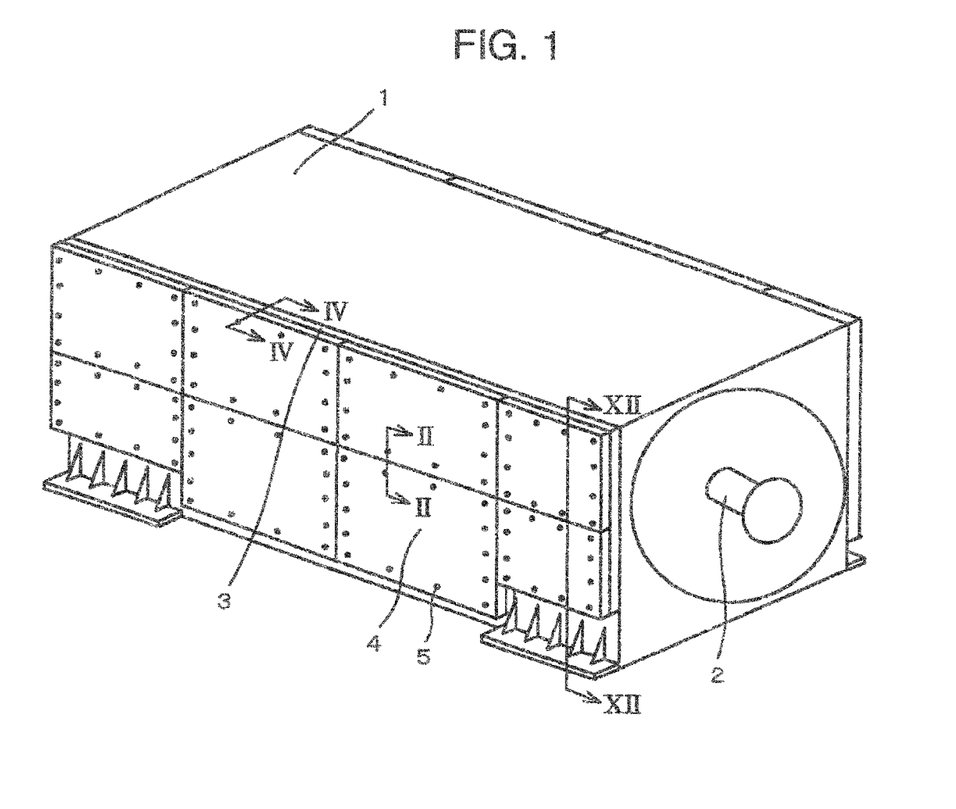
FIG. 1 is a perspective view showing a turbine power generator corresponding to a first embodiment of a rotary electric motor in accordance with the present invention.
Figure 4:
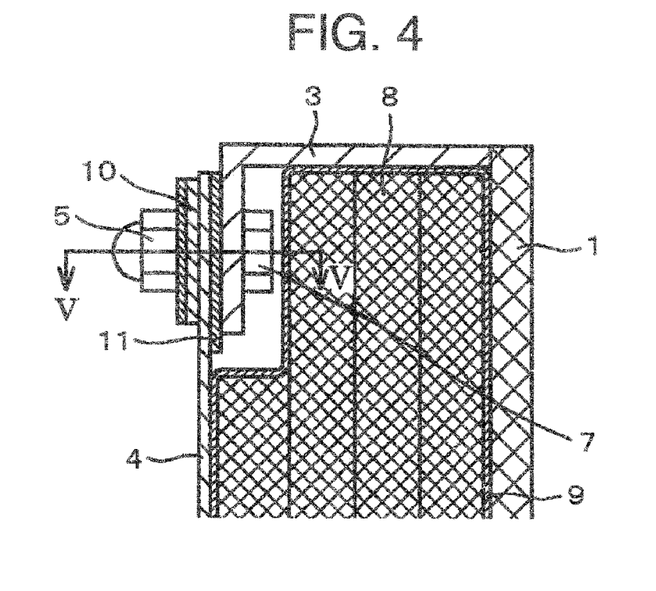
FIG. 4 is a cross sectional view as seen from the arrow IV-IV in FIG. 1, and shows a connecting structure between end portions of the noise insulation plate and the noise insulation plate attaching seat.
Figure 5:
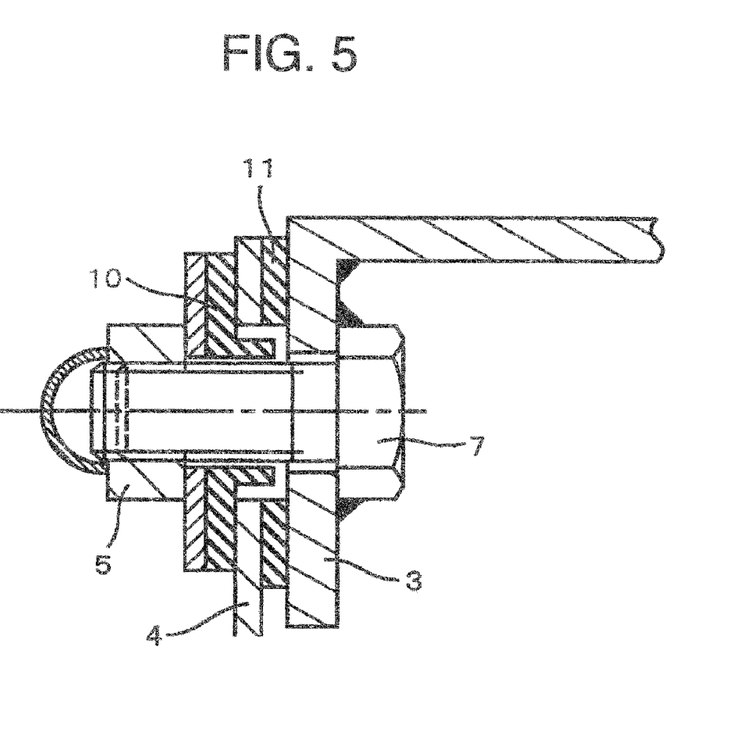
FIG. 5 is a cross sectional view as seen from the arrow V-V in FIG. 4, and shows details of the connecting structure in FIG. 4.
Figure 12:
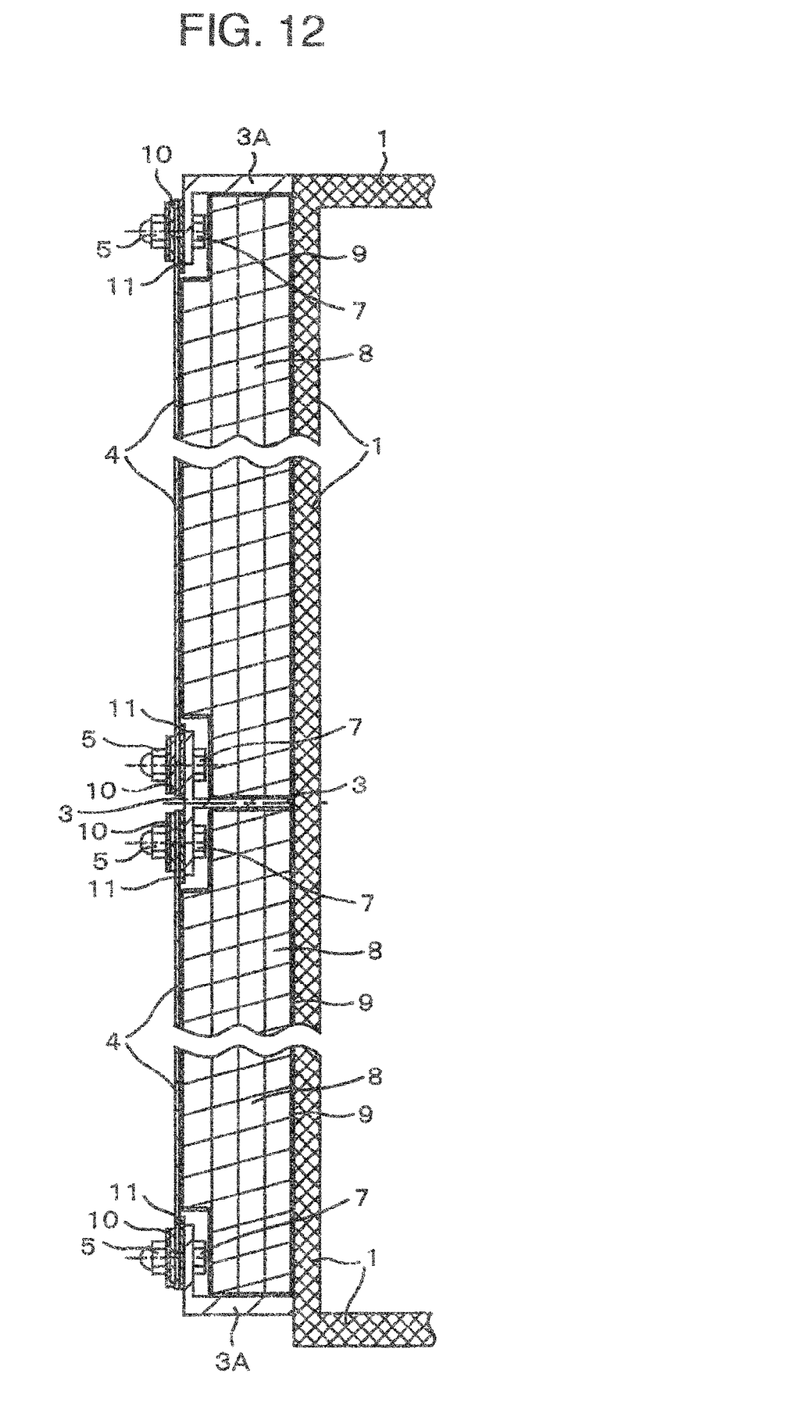
FIG. 12 is a cross sectional view as seen from the arrow XII-XII in FIG. 1, and shows a connecting structure between a noise insulation plate and a noise insulation plate attaching seat.

A description will be given of an embodiment in accordance with the present invention with reference to the accompanying drawings. FIG. 1 shows a whole structure of a turbine power generator corresponding to a first embodiment of a rotary electric motor in accordance with the present invention, FIG. 2 is a cross sectional view as seen from an arrow II-II in FIG. 1, FIG. 3 is a cross sectional view as seen from an arrow III-III in FIG. 2, FIG. 4 is a cross sectional view as seen from the arrow IV-IV in FIG. 1, FIG. 5 is a cross sectional view as seen from the arrow V-V in FIG. 4, and FIG. 12 is a cross sectional view as seen from the arrow XII-XII in FIG. 1.

In the drawings, reference numeral 1 denotes a stator frame. Within the stator frame 1, there are incorporated a stator structured such that a stator coil is installed in a stator iron core, and a rotor 2 arranged so as to oppose to the stator and structured such that a rotor coil is installed in a rotor iron core.

Figure 2:
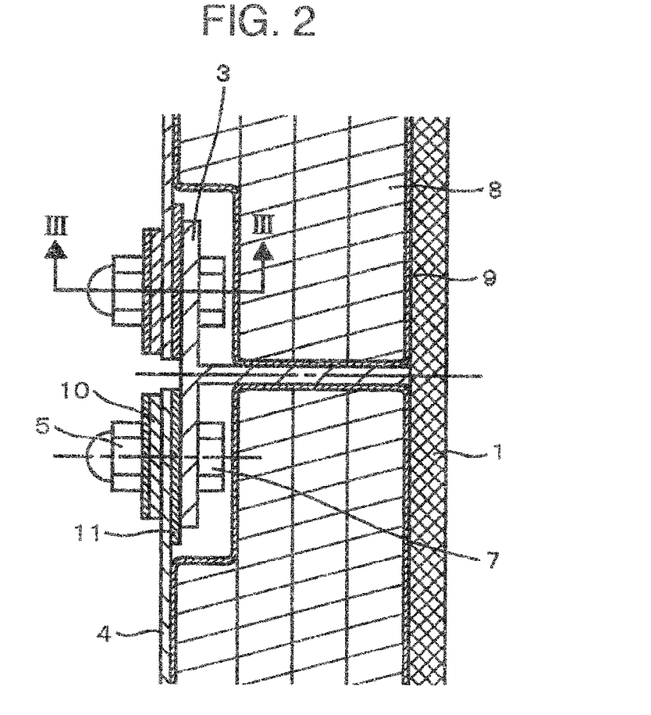
FIG. 2 is a cross sectional view as seen from an arrow II-II in FIG. 1, and shows a connecting structure between a noise insulation plate and a noise insulation plate attaching seat.
Figure 3:
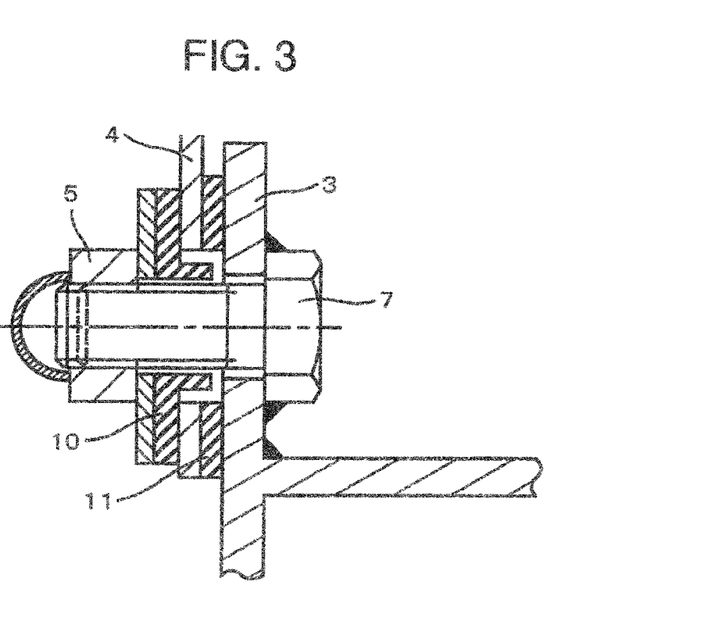
FIG. 3 is a cross sectional view as seen from an arrow III-III in FIG. 2, and shows details of the connecting structure in FIG. 2.

In FIGS. 2 and 3, an acoustic absorbent 8 made of a glass wool surrounded by an acoustic absorbent scattering preventing cover 9 is arranged on an outer surface of the stator frame 1, and a plurality of divided noise insulation plates 4 are arranged on an outer surface of the acoustic absorbent 8. In addition, as shown in FIG. 12, a T-shaped section noise insulation plate attaching seat 3 extending in an axial direction is weld-fixed to a center part of a side portion of an outer surface in a stator frame 1, and the end portion of the noise insulation plate 4 disposed in a divided manner is fixed to the T-shaped insulation plate attaching seat 3 by using fastening means including a bolt 7 and a nut 5. Further, a gasket 11 corresponding to an elastic body is arranged between the T-shaped noise insulation plate attaching seat 3 and the noise insulation plate 4, and a vibration-proofing rubber washer 10 serving as the elastic body having a function of preventing a vibration from being propagated is arranged between the noise insulation plate 4 and the nut 5.

In other words, in the present embodiment, the bolt 7 passes through the T-shaped noise insulation plate attaching seat 3, the gasket 11, the noise insulation plate 4 and the vibration-proofing rubber washer 10, and the bolt 7 is fastened by the nut 5. However, at this time, the vibration-proofing rubber washer 10 is arranged between the nut 5 and the noise insulation plate 4, and the gasket 11 is arranged between the T-shaped noise insulation plate attaching seat 3 and the noise insulation plate 4 so as to be fastened.

Meanwhile, in the portion shown in FIGS. 2 and 3, the T-shaped noise insulation plate attaching seat 3 is fixed to the center part of the side surface portion of the stator frame 1. On the contrary, in the portion shown in FIGS. 4 and 5, differently, an L-shaped section noise insulation plate attaching seat 3A extending in an axial direction from the upper and lower parts of the side portion of the stator frame 1 is fixed to the stator frame 1 (see FIG. 12).

The end portion of the noise insulation plate 4 disposed in a divided manner is fixed to the L-shaped noise insulation plate attaching seat 3A by using fastening means including the bolt 7 and the nut 5. In addition, a gasket 11 as an elastic body is disposed between the L-shaped noise insulation plate attaching seat 3A and the noise insulation plate 4, and a vibration-proofing rubber washer 10 as vibration-proofing means having a function of preventing the propagation of the vibration is disposed between the noise insulation plate 4 and the nut 5.

As shown in FIG. 12 which is a cross sectional view seen from the arrow XII-XII in FIG. 1, the L-shaped noise insulation plate attaching seat 3A extending in an axial direction from the upper and lower parts of the side surface portion of the stator frame 1 and the T-shaped noise insulation plate attaching seat 3 extending in an axial direction from the center part of the side surface portion of the stator frame 1 are weld-fixed to the stator frame 1, respectively. However, after the L-shaped noise insulation plate attaching seat 3A and the T-shaped noise insulation plate attaching seat 3 are attached to the stator frame 1, an acoustic absorbent 8 made of a glass wool surrounded by an acoustic absorbent scattering preventing cover 9 is installed on the stator frame 1 so as to come into contact with each other. Next, the noise insulation plate 4 is fixed to the upper L-shaped noise insulation plate attaching seat 3A and the central T-shaped noise insulation plate attaching seat 3, and is fixed to the central T-shaped noise insulation plate attaching seat 3 and the lower L-shaped noise insulation plate attaching seat 3A.

Then, the bolt 7 penetrates each of holes provided in the noise insulation plate 4 and the noise insulation plate attaching seats 3 and 3A, and the bolt 7 is fixed by being fastened using the nut 5. At this time, the vibration-proofing rubber washer 10 is disposed between the nut 5 and the noise insulation plate 4, and the gasket 11 is disposed between the noise insulation plate 4 and the noise insulation plate attaching seats 3 and 3A.

In addition, the T-shaped noise insulation plate attaching seat 3 may include one which extends in a vertical direction from the center part of the side portion of the stator frame 1. Further, the L-shaped noise insulation plate attaching seat 3A may be provided on all of the edge parts of the side portion of the stator frame 1.

In accordance with the first embodiment having the structure mentioned above, it is possible to prevent the vibration from being propagated from the stator frame 1 to the noise insulation plate 4 together with the noise, and it is possible to achieve an effective sound insulation.

In other words, in the present embodiment, since the stator frame 1, the T-shaped noise insulation plate attaching seat 3, the L-shaped noise insulation plate attaching seat 3A and the noise insulation plate 4 come into contact with each other only via the gasket 11 and the vibration-proofing rubber washer 10 serving as the elastic body, it is possible to reduce a solid propagation sound from the stator frame 1, the T-shaped noise insulation plate attaching plate 3 or the L-shaped noise insulation plate attaching plate 3A to the noise insulation plate 4. Accordingly, the effective sound insulation can be achieved without such a countermeasure as an installation of the noise insulation enclosure, an installation of the acoustic absorbent in an inner side of the stator frame 1, and an increase of thickness of the stator frame 1.

In this case, as a material having a function of preventing the vibration from being propagated and a sealing function, there can be considered a rubber, a gasket and the like in addition to the vibration-proofing rubber. Further, as the acoustic absorbent 8, there can be considered a rock wool and a sponge in addition to the glass wool.

Embodiment 2

Figure 6:
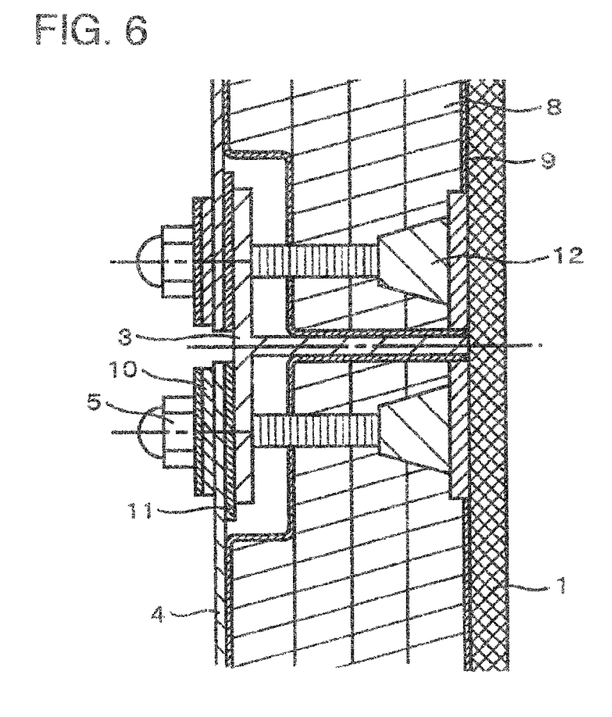
FIG. 6 shows a turbine power generator corresponding to a second embodiment of a rotary electric motor in accordance with the present invention, and is a view corresponding to FIG. 2.

FIG. 6 shows a second embodiment of a turbine power generator corresponding to a rotary electric machine in accordance with the present invention, and corresponds to a modified embodiment of the first embodiment mentioned above.

The second embodiment is different from the first embodiment mentioned above in a point that, in place of the bolt 7, there is employed a stud bolt 12 in which one end portion is firmly attached to the stator frame 1, and the other end passes through the noise insulation plate attaching seat 3, the gasket 11, the noise insulation plate 4 and the vibration-proofing rubber washer 10, and the other end portion of the stud bolt 12 is fastened by the nut 5. The vibration-proofing rubber washer 10 is arranged between the nut 5 and the noise insulation plate 4, and the gasket 11 is arranged between the noise insulation plate attaching seat 3 and the noise insulation plate 4. The other structures are the same as the first embodiment mentioned above.

In accordance with the second embodiment mentioned above, its effect is the same as the first embodiment mentioned above. Further, since the noise insulation plate attaching seat 3 is more firmly fixed by the stud bolt 12, the propagation of the vibration from the stator frame 1 to the noise insulation plate 4 can be more securely prevented in comparison with the first embodiment, and it is possible to achieve an effective sound insulation.

Embodiment 3

Figure 7:
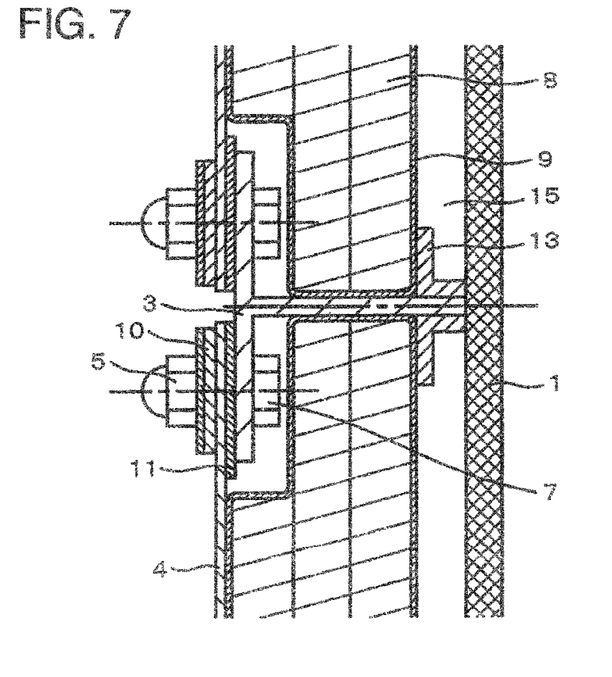
FIG. 7 shows a turbine power generator corresponding to a third embodiment of a rotary electric motor in accordance with the present invention, and is a view corresponding to FIG. 2.

FIG. 7 shows a third embodiment of a turbine power generator corresponding to a rotary electric machine in accordance with the present invention, and shows a modified embodiment of the first embodiment mentioned above.

The third embodiment is different from the first embodiment mentioned above in a point that a space portion 15 is formed between the stator frame 1 and the acoustic absorbent 8 surrounded by the acoustic absorbent scattering preventing cover 9, and an acoustic absorbent retention bracket 13 holding the acoustic absorbent 8 is arranged in the space portion 15.

An acoustic absorbent retention bracket 13 is fixed to the stator frame 1 around the T-shaped noise insulation plate attaching seat 3 serving as a center axis, and supports the acoustic absorbent 8 surrounded by the acoustic absorbent scattering preventing cover 9 between the noise insulation plate 4 and the acoustic absorbent retention bracket 13. The other structures are the same as the first embodiment mentioned above.

In accordance with the third embodiment mentioned above, its effect is the same as the first embodiment mentioned above. Further, in the present embodiment, attention is paid to the fact that an amount of sound insulation and an insulated sound frequency characteristic are changed in accordance with a distance from the stator frame 1 to the acoustic absorbent 8, and the space portion 15 having an optional distance is set between the stator frame 1 and the acoustic absorbent 8 so as to adjust the amount of sound insulation and the insulated sound frequency. Further, since the stator frame 1 and the noise insulation plate attaching seat 3 are in contact with the noise insulation plate 4 via only the elastic body such as the vibration-proofing rubber washer 10 and the gasket 11, the propagation of the vibration to the noise insulation plate 4 can be prevented, and it is possible to achieve an effective sound insulation.

Embodiment 4

Figure 8:
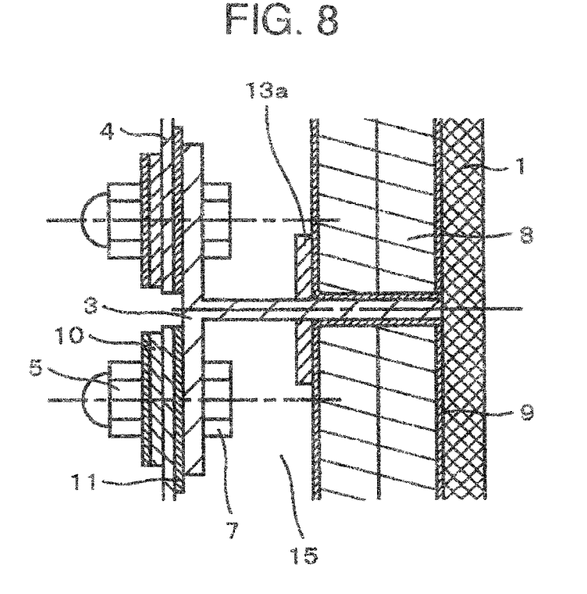
FIG. 8 shows a turbine power generator corresponding to a fourth embodiment of a rotary electric motor in accordance with the present invention, and is a view corresponding to FIG. 2.

FIG. 8 shows a fourth embodiment of a turbine power generator corresponding to a rotary electric machine in accordance with the present invention, and corresponds to a modified embodiment of the third embodiment mentioned above.

The fourth embodiment is different from the third embodiment mentioned above in the following point. In other words, in the third embodiment, the space portion 15 is formed between the stator frame 1 and the acoustic absorbent 8 surrounded by the acoustic absorbent scattering preventing cover 9. On the other hand, in the fourth embodiment, the space portion 15 is formed between the noise insulation plate 4 and the acoustic absorbent 8, an acoustic absorbent retention bracket 13a holding the acoustic absorbent 8 surrounded by the acoustic absorbent scattering preventing cover 9 supported by the T-shaped noise insulation attaching seat 3 is arranged in the space portion 15 between the noise insulation plate 4 and the acoustic absorbent 8, and the space portion 15 is not formed between the stator frame 1 and the acoustic absorbent 8.

In accordance with the fourth embodiment mentioned above, its effect is the same as the first embodiment mentioned above. Further, in the present embodiment, attention is paid to the fact that the amount of sound insulation and the frequency of the insulated sound are changed in accordance with a distance from the acoustic absorbent 8 and the noise insulation plate 4, and a space portion 15a having an optional distance is provided between the acoustic absorbent 8 and the noise insulation plate 4, and the distance between the noise insulation plate 4 and the acoustic absorbent 8 is determined in such a manner that the amount of sound insulation and the insulated sound frequency come to preferable values, thereby adjusting the amount of sound insulation and the insulated sound frequency to be insulated. Further, since the stator frame 1 and the noise insulation plate attaching seat 3 are in contact with the noise insulation plate 4 via only the elastic body such as the vibration-proofing rubber washer 10 and the gasket 11, the propagation of the vibration to the noise insulation plate 4 can be prevented, and it is possible to achieve an effective sound insulation.

Embodiment 5

Figure 9:
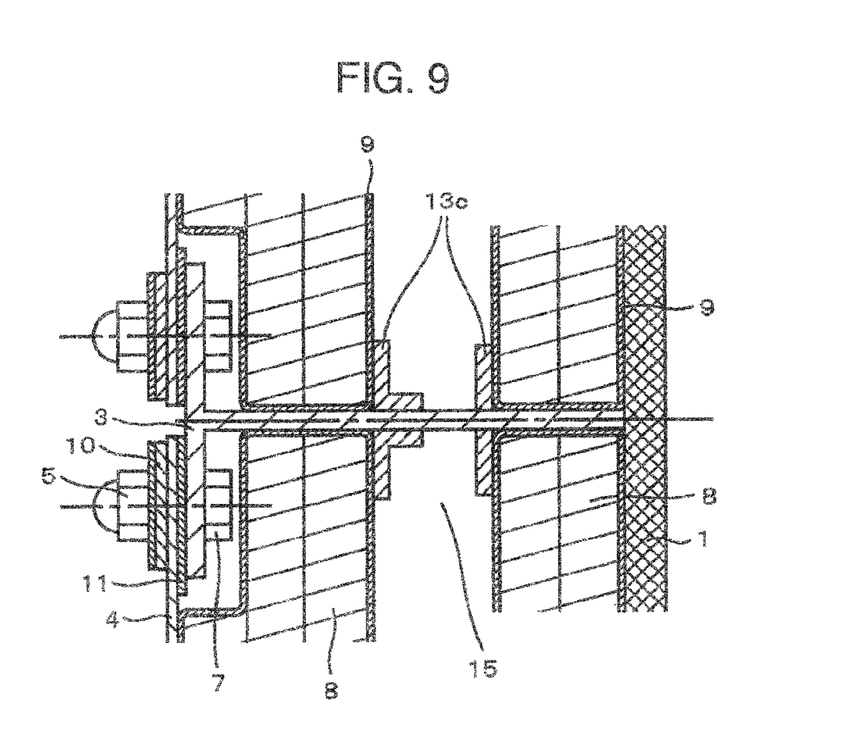
FIG. 9 shows a turbine power generator corresponding to a fifth embodiment of a rotary electric machine in accordance with the present invention, and corresponds to FIG. 2.

FIG. 9 shows a fifth embodiment of a turbine power generator corresponding to a rotary electric machine in accordance with the present invention, and corresponds to modified examples of the third and fourth embodiments mentioned above.

The fifth embodiment is different from the third and fourth embodiments mentioned above in the following point. In the third embodiment, a space portion 15 is formed between the stator frame 1 and the acoustic absorbent 8 surrounded by the acoustic absorbent scattering preventing cover 9. In the fourth embodiment, the space portion 15 is formed between the acoustic absorbent 8 and the noise insulation plate 4. On the contrary, in the fifth embodiment, the space portion 15 is formed between the acoustic absorbent 8 coming into contact with the stator frame 1 and the acoustic absorbent 8 coming into contact with the noise insulation plate 4, an acoustic absorbent retention bracket 13c for retaining the acoustic absorbent 8 surrounded by the acoustic absorbent scattering preventing cover 9 supported by the noise insulation plate attaching seat 3 is disposed in the space portion 15, and then the space portion 15 is not formed between the stator frame 1 and the acoustic absorbent 8 and between the acoustic absorbent 8 and the noise insulation plate 4.

In accordance with the fifth embodiment mentioned above, its effect is the same as the first embodiment mentioned above. Further, in the present embodiment, attention is paid to the fact that the amount of sound insulation and the frequency characteristic of the insulated sound are changed in accordance with a distance from the acoustic absorbent 8 coming into contact with the stator frame 1 to the acoustic absorbent 8 coming into contact with the noise insulation plate 4.

Accordingly, the space portion 15 having an optional distance is provided between the acoustic absorbents 8, and the distance from the acoustic absorbent 8 coming into contact with the stator frame 1 to the acoustic absorbent 8 coming into contact with the noise insulation plate 4 is determined in such a manner that the amount of sound insulation and the insulated sound frequency come to preferable values, so as to adjust the amount of sound insulation and the insulated sound frequency to be insulated.

Further, since the stator frame 1 and the noise insulation plate attaching seat 3 are in contact with the noise insulation plate 4 via only the elastic body such as the vibration-proofing rubber washer 10 and the gasket 11, the propagation of the vibration to the noise insulation plate 4 can be prevented, and thus an effective sound insulation can be carried out.

Embodiment 6

Figure 10:
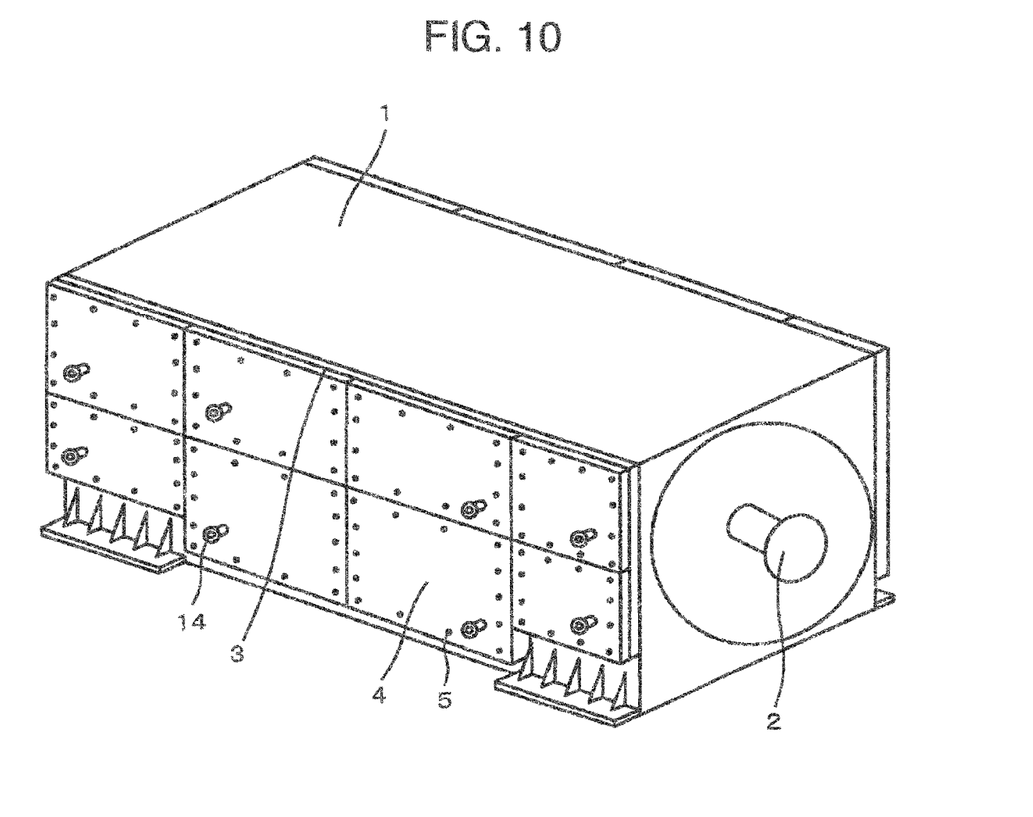
FIG. 10 is a perspective view showing a turbine power generator corresponding to a sixth embodiment of a rotary electric motor in accordance with the present invention.
Figure 11:
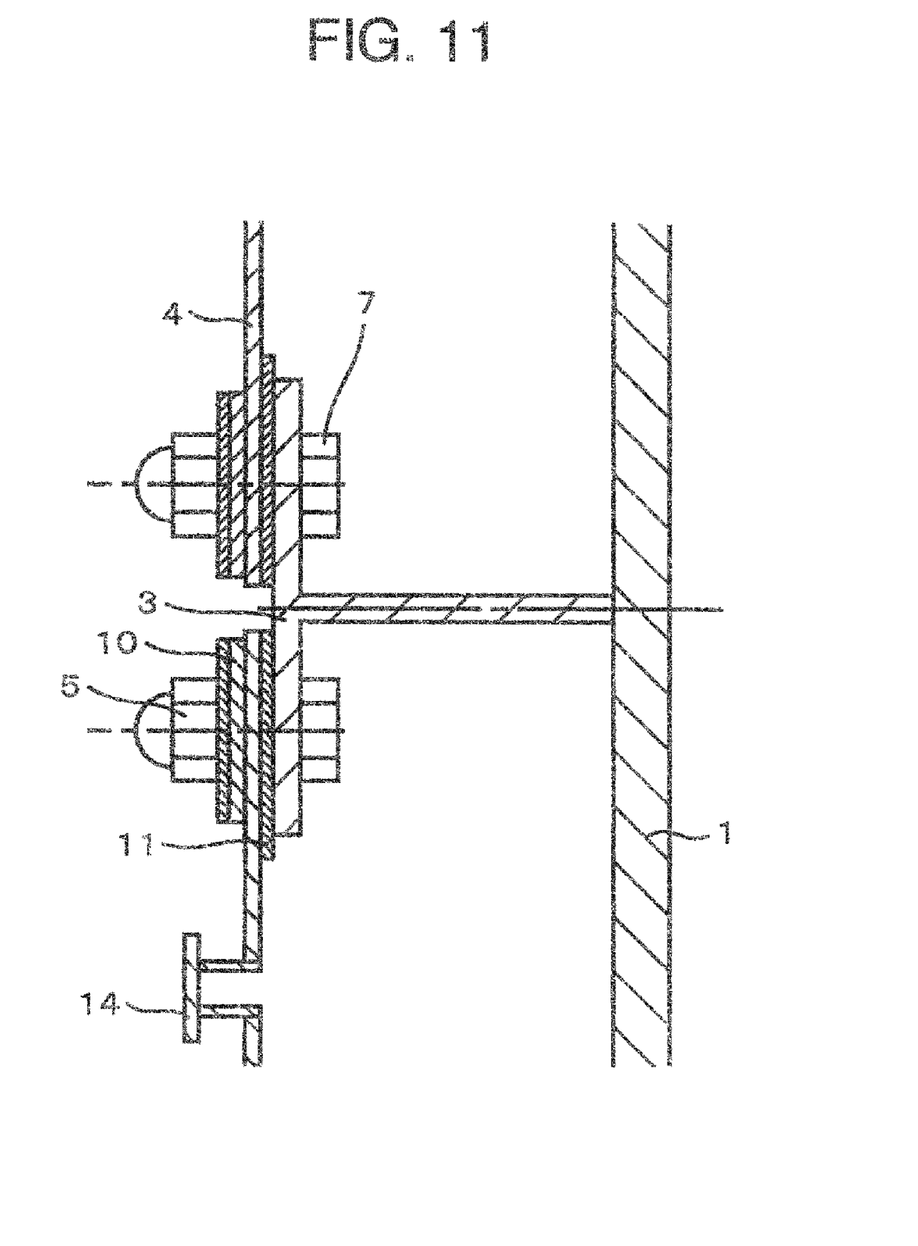
FIG. 11 is a cross sectional view showing a connecting structure between a noise insulation plate and a noise insulation plate attaching seat of a turbine power generator corresponding to a seventh embodiment of a rotary electric machine in accordance with the present invention.

FIGS. 10 and 11 show a sixth embodiment of a turbine power generator corresponding to a rotary electric machine in accordance with the present invention, and corresponds to a modified embodiment of the first embodiment mentioned above. FIG. 10 shows a whole structure of the turbine power generator, and FIG. 11 shows a cross sectional structure of the noise insulation plate and the noise insulation plate attaching seat.

In the present embodiment shown in the drawings, reference numeral 1 denotes the stator frame. Within the stator frame 1, there are incorporated the stator structured such that the stator coil is installed in the stator iron core, and the rotor 2 arranged so as to oppose to the stator and structured such that the rotor coil is installed in the rotor iron core.

Further, in the present embodiment, the acoustic absorbent made of the glass wool surrounded by the acoustic absorbent scattering preventing cover is not arranged on the outer surface of the stator frame 1, and a plurality of divided noise insulation plates 4 are not arranged on the outer surface of the acoustic absorbent as is different from the first embodiment, but a space portion 16 is formed between the stator frame 1 and the noise insulation plate 4, the noise insulation plate attaching seat 3 firmly attached to a part of the outer surface of the stator frame 1 by welding is arranged within the space portion 16, and the end portion of the divisionally arranged noise insulation plate 4 is fixed to the noise insulation plate attaching seat 3 by the fastening means constituted by the bolt 7 and the nut 5.

Further, in the present embodiment, a pressure of the space portion 16 is set to a negative pressure, for example, $10^{-1}$ torr to $10^{-2}$ torr.

Further, the gasket 11 serving as the elastic body is arranged between the noise insulation plate attaching seat 3 and the noise insulation plate 4, and the vibration-proofing rubber washer 10 serving as the vibration-proofing means having the function of preventing the propagation of the vibration is arranged between the noise insulation plate 4 and the nut 5. The bolt 7 passes through the noise insulation plate attaching seat 3, the gasket 11, the noise insulation plate 4, and the vibration-proofing rubber washer 10, and the bolt 7 is fastened by the nut 5. At this time, the vibration-proofing rubber washer 10 is arranged between the nut 5 and the noise insulation plate 4, and the gasket 11 is arranged between the noise insulation plate attaching seat 3 and the noise insulation plate 4 so as to be fastened. In this case, reference numeral 14 denotes a flange communicating with the space portion 16 for making the space portion 16 in a negative pressure state.

In accordance with the sixth embodiment mentioned above, its effect is the same as the first embodiment mentioned above. Further, in the present embodiment, attention is paid to the fact that the amount of sound insulation is different in correspondence to a pressure state between the stator frame 1 and the noise insulation plate 4. And, the negative pressure state in the space portion 16 is set between the stator frame 1 and the noise insulation plate 4 to $10^{-1}$ torr to $10^{-2}$ torr so as to increase the amount of sound insulation. Further, since the stator frame 1 and the noise insulation plate attaching seat 3 are in contact with the noise insulation plate 4 via only the vibration-proofing rubber washer 10 and the elastic body of the gasket 11, the propagation of the vibration to the noise insulation plate 4 can be prevented, and it is possible to achieve an effective sound insulation.

Embodiment 7

A seventh embodiment is structured such that an inert gas such as helium, argon or the like is filled in the space portion 16 between the stator frame 1 and the noise insulation plate 4 described in the sixth embodiment.

In accordance with the structure mentioned above, since the amount of sound insulation is increased by the inert gas such as helium, argon or the like, and the stator frame 1 and the noise insulation plate attaching seat 3 are in contact with the noise insulation plate 4 via only the elastic body such as the vibration-proofing rubber washer 10 and the gasket 11, the propagation of the vibration to the noise insulation plate 4 can be prevented, and it is possible to achieve an effective sound insulation.

The rotary electric machine in accordance with the present invention can achieve the low noise by the simple structure even in the case that the noise regulation value is severe, and does not require any additional means such as the noise insulation enclosure surrounding the periphery of the rotary electric machine, the acoustic absorbent in the inner side of the stationary frame, the increase of thickness of the stator frame and the like, for the noise insulation.

In this case, in the present invention, the description is given by exemplifying the power generator as the rotary electric machine, however, the present invention can be widely applied to an electric motor or the other rotary electric machines.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A rotary electric machine comprising:
   a stator structured such that a stator coil is incorporated in a stator iron core;
   a rotor arranged so as to oppose to said stator and structured such that a rotor coil is incorporated in a rotor iron core;
   said stator and said rotor being stored within a stator frame, wherein the rotary electric machine further comprises:
   an acoustic absorbent which is disposed on an outer surface of the stator frame;
   a plurality of noise insulating plates which is disposed in a divided manner on an outer surface of the acoustic absorbent;
   an L-shaped section noise insulation plate attaching seat which is fixed to the stator frame and extends along edge parts of a side portion in the stator frame at the edge parts thereof; and
   a T-shaped section noise insulation plate attaching seat which is fixed to the stator frame and extends in an axial direction from a center part of the side portion in the stator frame,
   wherein said noise insulation plates disposed in a divided manner are fixed to said L-shaped section noise insulation plate attaching seat and said T-shaped section noise insulation plate attaching seat by using fastening means, and
   wherein elastic bodies are installed between said noise insulation plates and said L-shaped section and T-shaped section noise insulation plate attaching seats, and are installed between said noise insulation plates and said fastening means.

2. A rotary electric machine as claimed in claim 1, wherein said fastening means is constituted by a bolt passing through said noise insulation plate attaching seat, said elastic body, said noise insulation plate and said elastic body, and a nut fastening said bolt, a vibration-proofing rubber washer serving as said elastic body is arranged between said nut and said noise insulation plate, and a gasket serving as said elastic body is arranged between said noise insulation plate attaching seat and said noise insulation plate.

3. A rotary electric machine as claimed in claim 1, wherein a space portion is provided between said acoustic absorbent and said stator frame.

4. A rotary electric machine as claimed in claim 3, wherein a retention bracket holding said acoustic absorbent is arranged in said space portion.

5. A rotary electric machine as claimed in claim 1, wherein a space portion is provided between said noise insulation plate and said acoustic absorbent.

6. A rotary electric machine as claimed in claim 1, wherein said fastening means is constituted by a stud bolt passing through said L-shaped and said T-shaped noise insulation plate attaching seats, the elastic body, the noise insulation plate and the elastic body and having one end firmly attached to said stator frame, and a nut fastening said stud bolt, a vibration-proofing rubber washer serving as said elastic body is arranged between said nut and said noise insulation plate, and a gasket serving as said elastic body is arranged between said L-shaped and said T-shaped noise insulation plate attaching seats and said noise insulation plate.

7. A rotary electric machine comprising:
   a stator structured such that a stator coil is incorporated in a stator iron core;
   a rotor arranged so as to oppose to said stator and structured such that a rotor coil is incorporated in a rotor iron core;
   said stator and said rotor being stored within a stator frame, wherein the rotary electric machine further comprises:
   an L-shaped section noise insulation plate attaching seat which is fixed to the stator frame and extends along edge parts of a side portion of said stator frame at the edge parts thereof; and
   a T-shaped section noise insulation plate attaching seat which is fixed to said stator frame and extends in an axial direction from a center part of said side portion of said stator frame,
   wherein the noise insulation plates disposed in a divided manner are fixed to the L-shaped noise insulation plate attaching seat and the T-shaped noise insulation plate attaching seat by using fastening means,
   wherein elastic bodies are installed between said noise insulation plates and said L-shaped section and T-shaped section noise insulation plate attaching seats, and are installed between said noise insulation plates and said fastening means,
   wherein a space portion is formed between said stator frame and said noise insulation plates, and
   wherein a pressure of said space portion is allowed to be negative or inert gas is filled in said space portion.

8. A rotary electric machine as claimed in claim 7, wherein said fastening means is constituted by a bolt passing through said noise insulation plate attaching seat, said elastic body, said noise insulation plate and said elastic body, and a nut fastening said bolt, a vibration-proofing rubber washer serving as said elastic body is arranged between said nut and said noise insulation plate, and a gasket serving as said elastic body is arranged between said noise insulation plate attaching seat and said noise insulation plate.

9. A rotary electric machine as claimed in claim 7, wherein in the case of setting said space portion under a negative pressure, the pressure is set between $10^{-1}$ torr and $10^{-2}$ torr.

10. A rotary electric machine as claimed in claim 7, wherein in the case that inert gas is filled in said space portion, the inert gas is constituted by helium or argon.

* * * * *